United States Patent Office 2,802,891
Patented Aug. 13, 1957

2,802,891

VULCANIZATION OF LATEX USING ORGANIC PEROXIDE

George B. Feild, New Castle, and Walter S. Ropp, Wilmington, Del., assignors to Hercules Powder Company, Wilmington, Del., a corporation of Delaware No Drawing. Application November 2, 1955,
Serial No. 544,589

4 Claims. (Cl. 260—773)

This invention relates to the art of vulcanizing rubber latex. More particularly, it relates to a process for vulcanizing rubber latex in the presence of a particular organic peroxide as an essential vulcanizing agent.

Some vulcanized rubber articles such as gloves, toy balloons, and foam rubber are made directly from rubber latex. In addition to ease of production, an advantage in quality is obtained through elimination of the degrading effects caused by milling rubber during dry compounding. In some instances where vulcanized articles are made directly from latex, it is desirable to eliminate the vulcanization step normally required after the article has been formed. In such cases there is used a latex in which the rubber particles have been vulcanized.

Up to the present time, the rubber industry has depended almost entirely upon sulfur or sulfur-bearing materials as vulcanizing agents not only for vulcanizing rubber in the dry state but also for vulcanizing rubber as it exists in latex. Processes are known in which vulcanization of latex is accomplished by introducing sulfur, or sulfur-bearing compounds, and other curatives into the latex and then heating to effect vulcanization without coagulation.

There are certain disadvantages inherent in the vulcanization of latex with sulfur or sulfur-bearing compounds, for example, the vulcanizing agent and other curatives added to the latex must pass through the water phase and into the rubber particles. The relative insolubility of such ingredients in both water and in rubber makes the vulcanization of latex a slow process, and the relatively high specific gravity of the sulfur and other curatives necessitates constant agitation to prevent settling.

It is an object of the present invention to provide a process for vulcanizing latex which is relatively simpler than vulcanization by means of sulfur or sulfur-bearing compounds.

In accordance with this invention, it has been found that both natural rubber latex and synthetic rubber latices can be vulcanized by incorporating in the latex a minor amount of a monoperoxyacetal of the formula

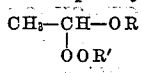

wherein R and R' are selected from the group consisting of saturated and aromatically unsaturated hydrocarbon radicals, and heating to effect vulcanization of the rubber particles in situ.

The process not only offers several advantages over prior art processes but also produces a product which is superior in many respects to corresponding prior art products. Procedurewise, the process is simple since the peroxide (unlike sulfur which ordinarily requires auxiliary curatives) is capable of effecting vulcanization without auxiliary agents. Additionally, the specific gravity of the peroxide is nearly equal to that of the latex so that the peroxide remains in suspension with little or no agitation. Productwise, vulcanized rubber obtained from the vulcanized latex by the steps of coagulating and drying is considerably less opaque than that obtained from sulfur vulcanized latex.

It is noteworthy also that the ability of the above defined peroxides to vulcanize latex is not shared by peroxides generally. For example, benzoyl peroxide, which is perhaps the most widely used of all organic peroxides and which has been recommended for use as a vulcanizing agent for dry rubber, cannot be used to vulcanize latex satisfactorily. It is a serious disadvantage, for example, that rubber films prepared from latex vulcanized with the latter peroxide are permanently deformed when stretched. By contrast, rubber films produced from latex vulcanized according to the invention exhibit substantially no permanent deformation when stretched.

The following examples illustrate the specific embodiments of the invention and show the effectiveness of the specified peroxide vulcanizing agents in the process of the invention. All parts and percentages are by weight unless otherwise specified.

EXAMPLE 1

In a mixing vessel there was placed 0.8 part of an aqueous 30% solution of potassium hydroxide and 12.8 parts of water. To this there was added 16.6 parts of the peroxide having the formula

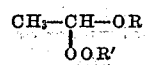

wherein R is isobutyl and R' is α-cumyl, and 0.9 part of oleic acid. The mixture was emulsified by vigorous agitation for 2 minutes. Portions of the above emulsion were added to 100 parts of natural rubber latex (60% rubber solids) to provide compositions having concentrations of 0.5, 1.0, and 1.5 parts of peroxide, respectively, per 100 parts of rubber solids. Dispersion of the peroxide emulsion into the latex was accomplished by light stirring.

Each composition was next sealed in a pressure vessel where it was heated to a temperature of 300° F. for 1 hour. On removal of the latex for the vessel, little or no coagulation was visible. In order to observe the effects of the vulcanization, 25 ml. of the vulcanized product was poured into a flat, square, unglazed ceramic tile vessel, approximately 4 inches square. The latex in the casting vessel was then allowed to stand for 2 hours whereupon congealing took place. The vesesl was then placed into a hot air oven at a temperature of 125° F. for about 8 hours. Th ceramic vessel was next removed from the oven, soaked with its contents for 30 minutes in cold water, and a film of vulcanized rubber, approximately 40-50 mils in thickness, was stripped off.

Standard type "C" dumbbell specimens were cut from the rubber film obtained from each composition, dried in an oven for one hour at 150° F., and these were tested by standard ASTM methods for tensile stress at various elongations, tensile strength, and maximum elongation. The tests were made on the Instron tensile tester using a cross head speed of 20 inches per minute and an initial grip separation of 1.0 inch. The percent permanent deformation was also obtained 10 minutes after each test specimen had broken. A control run in which no peroxide was used was included for comparative purposes. The following physical property data were obtained:

Table I

| Peroxide Concentration | Tensile Stress (p. s. i.) at Indicated Percent Elongation | | | | Tensile Strength (p. s. i.) | Maximum Elongation (percent) | Percent Permanent Deformation |
|---|---|---|---|---|---|---|---|
| | 100 | 300 | 500 | 700 | | | |
| 0.5 | 53 | 92 | 135 | 281 | 1,705 | 1,035 | Nil |
| 1.0 | 63 | 115 | 172 | 498 | 1,785 | 885 | Nil |
| 1.5 | 66 | 141 | 255 | 1,020 | 1,340 | 750 | Nil |
| Control | 50 | 53 | 49 | 57 | 324 | 1,135 | >100 |

It is apparent from the results tabulated that vulcanization has had profound effect on the quality of the rubber film obtained from the vulcanized latex.

EXAMPLE 1A

For comparative purposes, benzoyl peroxide was substituted in a single test for the monoperoxyacetal. The benzoyl peroxide was emulsified in the manner of Example 1 and the vulcanization procedure and test procedure were similar to those described in Example 1. The test data are as follows:

Table II

| Peroxide Content (percent) | Tensile Stress (p. s. i.) at Indicated Percent Elongation | | | | Tensile Strength (p. s. i.) | Maximum Elongation (percent) | Percent Permanent Deformation |
|---|---|---|---|---|---|---|---|
| | 100 | 300 | 500 | 700 | | | |
| 1.0 | 51 | 60 | 65 | 101 | 1,425 | 1,290 | 60 |

It is obvious that the 60% permanent deformation exhibited by the film of rubber obtained from latex vulcanized with benzoyl peroxide is an unsatisfactory result.

EXAMPLE 2

The composition of Example 1 which had been vulcanized with 1.5% peroxide was further tested for physical properties after exposure in an oxygen bomb for 120 hours at 70° C. and 300 p. s. i. The data are as follows:

Table III

| Tensile Stress (p. s. i.) at Indicated Percent Elongation | | | Tensile Strength (p. s. i.) | Maximum Elongation (percent) |
|---|---|---|---|---|
| 100 | 300 | 500 | | |
| 43 | 89 | 153 | 1,210 | 790 |

It was noted further that the exposed test pieces suffered no distortion in the oxygen bomb. By contrast, a film produced from a commercially available sulfur-vulcanized latex deteriorated so greatly in the oxygen bomb that physical strength measurements were impossible.

The monoperoxyacetals utilized in preparing the compositions of the invention and in the process of the invention have the structural formula

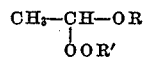

wherein R and R' are selected from the group consisting of saturated and aromatically unsaturated hydrocarbon radicals. These compounds are obtainable by the reaction of a vinyl ether of the formula $CH_2=CHOR$ and a hydroperoxide of the formula $R'OOH$, wherein R and R' are as defined as above. The reaction is catalyzed by an acid-acting condensation catalyst. The following examples illustrate the preparation of typical monoperoxyacetals within the scope of the above formula.

EXAMPLE A

To a solution of 21.8 parts 95% dihydroterpinyl vinyl ether and 18.2 parts 97% cumene hydroperoxide in 360 parts dry benzene cooled to 19° C. in a water bath was added about 0.2 part by weight gaseous boron trifluoride. The temperature rose gradually to 28° C. during the addition of the boron trifluoride. After about 10 minutes, the reaction mixture was washed with an equal volume of 5% aqueous sodium hydroxide solution in four portions and then with an equal volume of water in three portions. The benzene was evaporated under reduced pressure with a nitrogen sparge. The residue amounting to 34.4 parts analyzed 0% cumene hydroperoxide and 89% of the peroxide corresponding to the formula

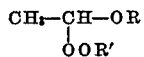

where R is dihydro-α-terpinyl and R' is α-cumyl.

The method of analysis for the total peroxy compounds was essentially that of Wagner, Smith and Peters, Analytical Chemistry 19, 976–9 (1947) in which iodine liberated from sodium iodide is titrated, with the modification in that concentrated hydrochloric acid was added to hydrolyze the acetal so that all of the peroxy compounds reacted with the sodium iodide with liberation of titratable iodine. Cumene hydroperoxide was determined polarographically. The percent peroxyacetal was determined by the difference between total peroxide and cumene hydroperoxide.

EXAMPLE B

To a solution of 14.4 parts vinyl ethyl ether and 40.6 parts 74.9% cumene hydroperoxide in 600 parts dry benzene cooled to 3° C. in an ice bath was added about 0.1 part boron trifluoride. The temperature rose spontaneously to 16° C. and then gradually fell to about 3° C. After 5–10 minutes total reaction time, the solution was washed with an equal volume of 5% sodium hydroxide in four portions and then with an equal volume of water in five portions. The solvent was stripped off under reduced pressure with a nitrogen sparge. The product remaining as a benzene-free residue amounted to 49.3 parts. Its analysis showed 3.15% cumene hydroperoxide by polarographic analysis and 87.5% of the peroxyacetal of the formula

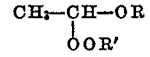

in which R is ethyl and R' is α-cumyl by using the difference between total peroxides and cumene hydroperoxide by polarographic analysis.

EXAMPLE C

Example B was repeated using 62.7 parts 47.7% p-menthane hydroperoxide and 20 parts isobutyl vinyl ether. The yield of product was 67.5 parts analyzing 61.2% of a product of the formula

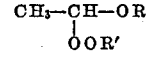

where R is isobutyl and R' is p-menthyl.

EXAMPLE D

To a solution of 20 parts isobutyl vinyl ether and 40.6 parts 74.9% cumene hydroperoxide in 600 parts benzene at 25° C. was added 0.4 parts p-toluene sulfonic acid monohydrate. The temperature immediately began to rise and reached 30° C. in one minute at which temperature it was maintained by use of an ice bath. After 10 minutes, when the reaction was complete, the mixture was washed with 200 parts 5% sodium hydroxide solution in two portions and then with 300 parts water in three portions. The benzene was stripped off under reduced pressure with a nitrogen sparge leaving a benzene-free residue of 56.4 parts. This residue was shown by analysis to contain 92.1% of a peroxyacetal of the formula

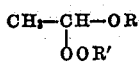

wherein R is isobutyl and R' is α-cumyl.

EXAMPLE E

Following the general procedure outlines in the preceding examples, three additional monoperoxyacetals were prepared from p-menthane hydroperoxide and dihydroterpinyl vinyl ether, vinyl ethyl ether, and n-butyl vinyl ether, respectively. This led to products containing 60.3%, 58.7%, and 56.7% monoperoxyacetals, respectively.

Typical hydroperoxides which are useful reactants for preparing the monoperoxyacetals are exemplified by cumene hydroperoxide, p-cymene hydroperoxide, p-diisopropylbenzene hydroperoxide, 1-phenylcyclohexyl hydroperoxide, p-menthane hydroperoxide (a mixture of isomeric hydroperoxides resulting from the replacement of hydrogens attached to the tertiary carbon atoms of p-menthane with hydroperoxy groups—obtainable by air oxidation of p-menthane), isopropylnaphthalene hydroperoxide, 1-methylcyclohexyl hydroperoxide-1, pinane hydroperoxide, t-butyl hydroperoxide, and t-amyl hydroperoxide. Typical vinyl ethers which are useful reactants for preparing the monoperoxyacetals are exemplified by dihydro-α-terpinyl vinyl ether, bornyl vinyl ether, isobornyl vinyl ether, fenchyl vinyl ether, dehydroabietyl vinyl ether, cyclohexyl vinyl ether, 1-methylcyclohexyl vinyl ether, methyl vinyl ether, ethyl vinyl ether, n-propyl vinyl ether, isopropyl vinyl ether, n-butyl vinyl ether, isobutyl vinyl ether, t-butyl vinyl ether, stearyl vinyl ether, and phenyl vinyl ether.

The acid-acting condensation catalysts which are useful in preparing the monoperoxyacetals are well known in the art and include the mineral acids, Friedel-Crafts type catalyst, acid clays, and organic sulfonic acids. While any of these catalysts is useful with most of the hydroperoxides, the organic sulfonic acids and boron trifluoride are preferred for use with α-aryl hydroperoxides. The amount of catalyst is preferably the minimum that is sufficient to catalyze the reaction. A catalytic amount will generally lie in the range of about 0.05% to 5% of the reaction mixture.

The reaction is carried out in nonaqueous media to avoid hydrolysis of the product. An inert solvent such as benzene or hexane is advantageously employed to facilitate control of the reaction. Other solvents which are useful in Friedel-Crafts reactions also are useful in preparing the monoperoxyacetals. Recovery of the peroxide is conveniently accomplished by neutralizing the catalyst with alkali and stripping off the solvent under reduced pressure at a temperature preferably below 50° C.

The condensation reaction between the hydroperoxide and the vinyl ether takes place readily at room temperature. A preferred temperature is from about 0° C. to about 30° C. Temperatures above about 80° C. accelerate decomposition of the product and can be used successfully only by carrying out the process with very short contact time.

The quantity of peroxide utilized in vulcanizing latex will depend to a great extent upon the conditions to be utilized during vulcanization. In general, the quantity may vary from 0.1% to 10% based on the weight of rubber solids in the latex. The preferred amount is from about 0.25% to about 2.5%. The amount of peroxide can also vary depending upon the type of latex and the properties desired in the final vulcanizate.

The examples have illustrated emulsification of the peroxide in water prior to its dispersion in the latex. This is a procedure which assures uniform distribution of the peroxide through the latex and which is advantageous for that reason. However, preliminary emulsification of the peroxide is not necessary; an adequate degree of vulcanization can be achieved if the peroxide is added in concentrated form to the latex and dispersed by stirring. However, some of the peroxides of the invention are solid at room temperature and in the case of such peroxides a slight warming is desirable to liquefy them prior to dispersion. In still another modification, dispersion of the peroxide in the latex can be aided by the addition of other materials to effect the emulsification of the peroxide directly in the latex. For instance, a quantity of peroxide and a relatively small quantity of a fatty acid can be added to latex which has been stabilized with ammonia in known manner whereby an ammonium salt of the fatty acid is formed in situ and functions as an emulsifying agent for the peroxide.

When it is desired to emulsify the peroxide prior to incorporation in the latex, conventional emulsifying agents and emulsifying apparatus can be used. Satisfactory emulsions can be prepared containing from about 1 to 50% peroxide by means of alkali metal soaps of fatty acids, ammonia or amine soaps of fatty acids, as well as many other agents. In this manner, a stable emulsion can be obtained by vigorous agitation.

Vulcanization of the latex following incorporation of the peroxide is accomplished simply by heating the latex to a temperature ranging from about 225–375° F. The optimum vulcanization temperature is from about 225–325° F. Within this range, vulcanization is substantially complete within a period of from about 180 to 30 minutes.

The invention is applicable to the vulcanization of both natural rubber latex and latices of synthetic rubbers known to the art as butalastic polymers such as those prepared by polymerizing diolefins, halogenated derivatives of diolefins or other substituted diolefins, or by copolymerizing diolefins with other compounds containing vinyl groups such as styrene, acrylic acid esters and acrylic acid nitrile. More particularly, the butalastic polymers may be those obtained by polymerizing any conjugated diolefin such as isoprene, dimethyl butadiene, and chloroprene or by copolymerizing isoprene and styrene or isoprene and acrylonitrile. Generically, butalastic polymers are defined by Marchionna [Marchionna, "Butalastic Polymers," Rheinhold (1946)] as synthetic, elastic polymers of a butadiene compound with or without other compounds polymerizable therewith.

Such latices are well known articles of commerce and can be vulcanized in the manner of the invention as they normally are sold or can be concentrated prior to vulcanization. Ordinarily, no difficulty is encountered due to premature coagulation of the latex. However, if desired, one or more of the commonly known latex stabilizers, such as soaps, sulfated vegetable oils, sulfated hydrocarbons, proteins, etc., can be added to the latex to prevent coagulation during vulcanization should any be encountered.

What we claim and desire to protect by Letters Patent is:

1. A process for vulcanizing a latex selected from the group consisting of natural rubber latex and latices of synthetic, rubbery polymers of a compound selected from the group consisting of conjugated diolefins and chloroprene which comprises incorporating in said latex from 0.1 to 10%, based on the weight of rubber solids in said latex, of a monoperoxyacetal having the formula

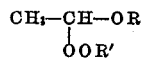

wherein R and R' are selected from the group consisting of saturated and aromatically unsaturated hydrocarbon radicals, and heating to effect vulcanization of the rubber particles in situ.

2. The process of claim 1 in which the latex is natural rubber latex.

3. The process of claim 2 in which the monoperoxyacetal has the formula

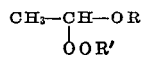

in which R is isobutyl and R' is α-cumyl.

4. The process of claim 2 in which the latex is heated to a temperature ranging from about 225 to 375° F.

References Cited in the file of this patent
UNITED STATES PATENTS
2,442,330    Fuller _____ June 1, 1948